Sept. 30, 1941.   J. PFEIFER ET AL   2,257,650
AGRICULTURAL MACHINE
Filed Oct. 24, 1939   3 Sheets-Sheet 2
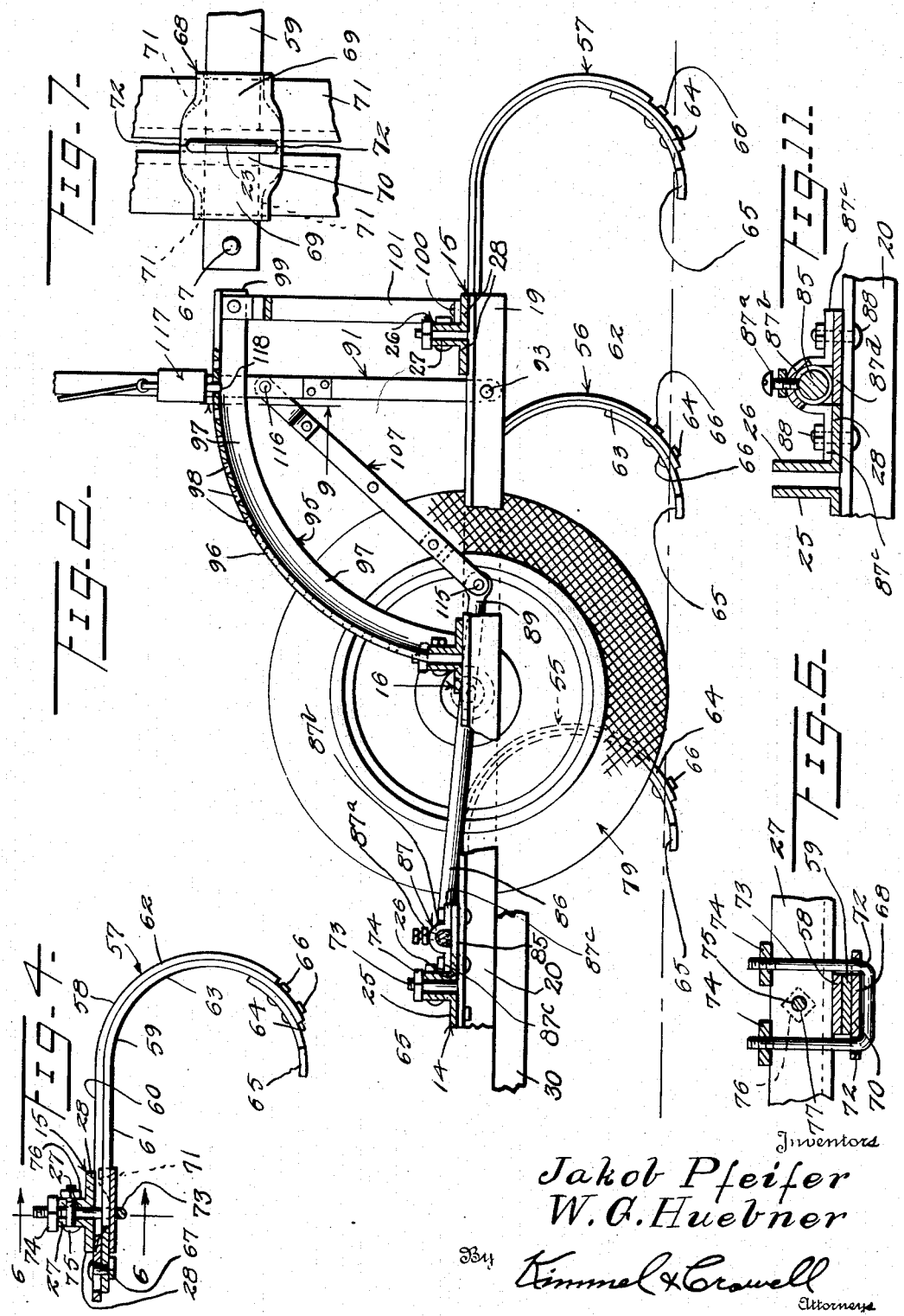
Inventors
Jakob Pfeifer
W. G. Huebner
By Kimmel & Crowell
Attorneys

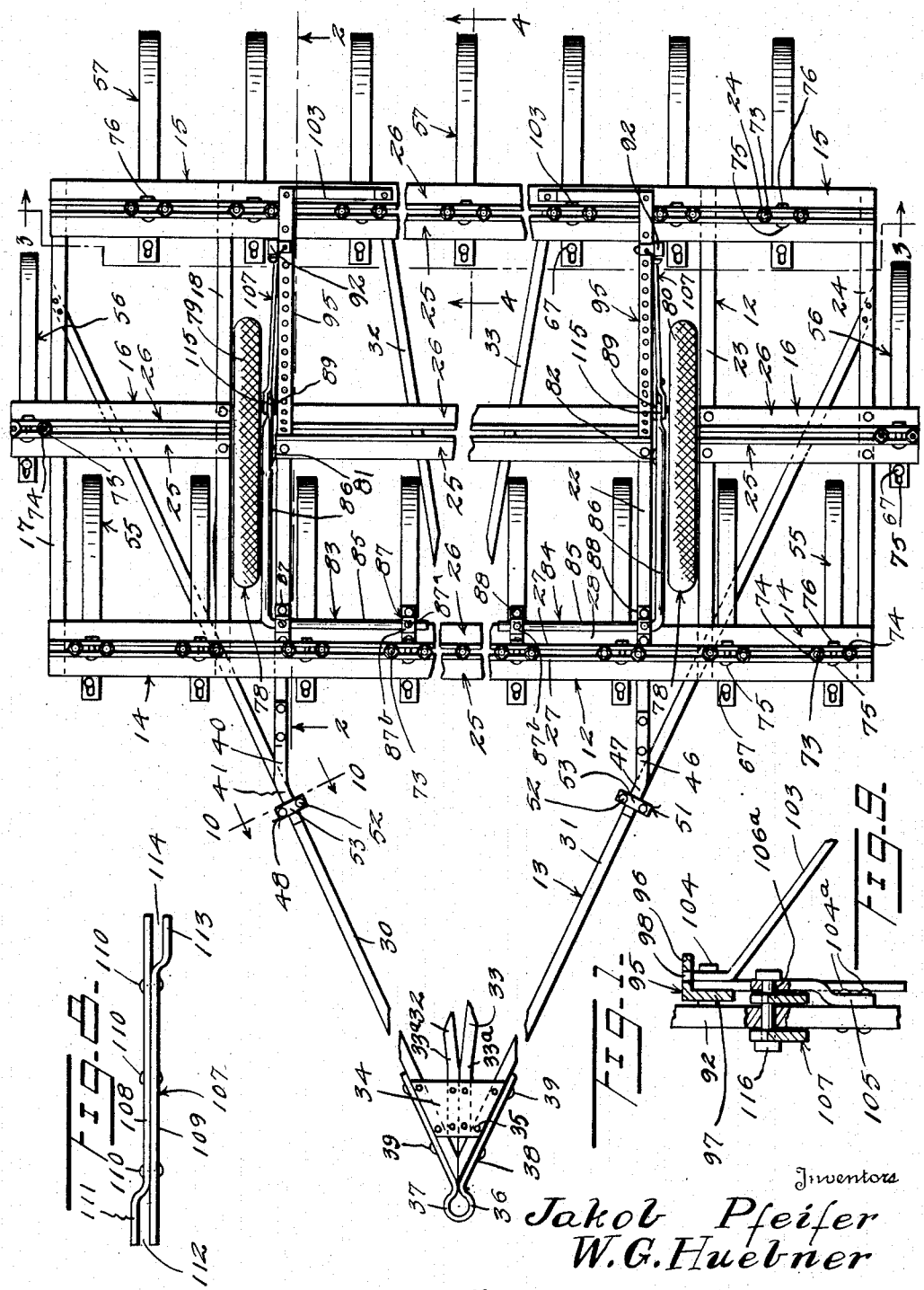

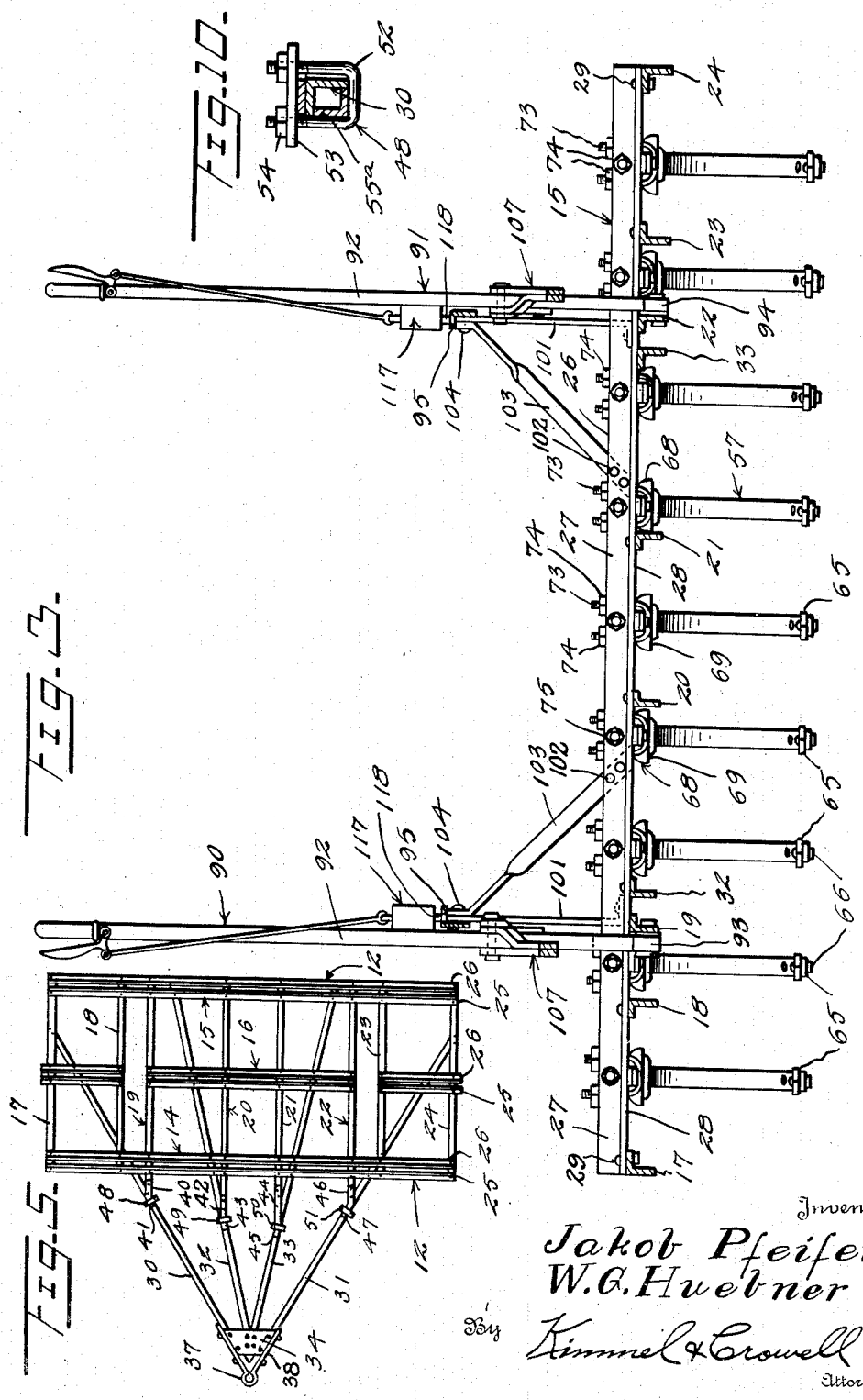

Patented Sept. 30, 1941

2,257,650

UNITED STATES PATENT OFFICE 2,257,650

AGRICULTURAL MACHINE

Jakob Pfeifer, Forgan, and Walter G. Huebner, Turpin, Okla.

Application October 24, 1939, Serial No. 301,028

6 Claims. (Cl. 97—233)

This invention relates to an agricultural machine of the ground working type, more particularly a cultivator-plow.

The invention aims to provide, in a manner as hereinafter set forth, a machine of the class referred to acting to break the ground with cloddy or irregular cuttings thereby making the surface rough instead of pulverized.

The invention further aims in the provision of a machine of the class referred to having means for breaking the soil in small irregular cloddy-like ridges, whereby no interference is had on crosswise plowing.

The invention further aims to provide, in a manner as hereinafter referred to, an agricultural machine of the ground working type with a braced rigid supporting frame having arranged therein for adjustably supporting it a pair of spaced parallel vertically adjustable traction elements for not only supporting the frame, but also for selectively disposing the latter at any desired position above and with respect to the ground.

The invention further resides in providing, in a manner as hereinafter set forth, an agricultural machine of the class referred to with reinforced, adjustable ground working elements possessing a resilient characteristic, capable of vibrating when active and when active functioning to tear and break land irregularly to make the surface cloddy.

The invention resides in the providing of each of the ground working elements of the machine in the form of a pair of superposed horizontally disposed resilient beams, with the upper beam of less length than the lower one, with the rear of the lower beam depending from the rear end of the upper beam, and with the lower beam having attached to its depending rear portion a shovel or plow acting to tear and break the land irregularly to make the surface cloddy.

The invention further resides in the manner in which the beams of a ground working element are adjustably connected together in superposed relation and the manner in which the beams of a ground working element are connected to the frame of the machine.

The invention further resides in the manner in which the ground working elements are arranged relative to the frame of the machine, whereby such arrangement will provide for said elements acting upon the ground below, at the rear of the front, back and adjacent the sides of the frame.

The invention further resides in the arrangement of the traction devices relative to the ground working elements whereby the said devices are always level, travel on substantially even-surfaced ground and are never hindered by irregular depths or side sway which would be the case if said devices should travel in the furrows as is done when the wheels are assembled at the sides of the machine frame.

The invention further aims to provide, in a manner as hereinafter set forth, a machine of the class referred to possessing an easy draft when chiseling or cultivating, acting to break up the ground in a small cloddy condition on the surface, including a hitch, a supporting frame, a braced drawbar structure fixed to the hitch for elevating and lowering the latter, bottom members forming an element of the frame and correlated with the drawbar structure for bracing it and constructed and arranged so as not to interfere with the ground working elements, disposing the working elements in natural and perfect position for easy operation and light draft, and providing for conveniently adjusting the traction devices.

The invention further aims to provide, in a manner as hereinafter set forth, an agricultural machine of the ground working type which is comparatively simple in its construction and arrangement, strong, durable, compact, thoroughly efficient in its use, expeditiously adjusted when desired, readily assembled, conveniently repaired and comparatively inexpensive to manufacture.

Embodying the aims aforesaid and others which may hereinafter appear, the invention consists of the novel construction, combination and arrangement of parts, as will be more specifically referred to and illustrated in the accompanying drawings, wherein is shown an embodiment of the invention, but it is to be understood that changes, variations and modifications may be resorted to which fall within the scope of the invention as claimed.

In the drawings:

Figure 1 is a fragmentary view in top plan of an agricultural machine in accordance with this invention, Figure 2 is a section on line 2—2 Figure 1, Figure 3 is a section on line 3—3 Figure 1, Figure 4 is a section on line 4—4 Figure 1, Figure 5 is a top plan view of the body portion of the machine, Figure 6 is a section on line 6—6 Figure 4, Figure 7 is a fragmentary detail in inverted plan, Figure 8 is a top plan view of the form of shifting elements employed for adjusting the traction devices, Figure 9 is a section on line 9—9 Figure 2, Figure 10 is a section on line 10—10 Figure 1, and Figure 11 is a detail partly in section and side elevation illustrating the coupling connection between the front frame member and a leg of an axle of the adjustable traction structure for the machine.

The machine includes a body portion formed of a frame generally indicated at 12 and a braced drawbar structure extended from the frame 12 generally indicated at 13.

The frame 12 (Figure 5) includes an upper front member 14, an upper rear member 15, an upper intermediate member 16 and a set of bottom members indicated at 17, 18, 19, 20, 21, 22, 23 and 24 disposed at right angles to the other of said members. The members 14, 15 are continuous. The member 16 is formed of a central and a pair of end endwise aligned spaced sections. The outer sections are extended outwardly in lateral relation with respect to corresponding ends of the members 14, 15. The members 14, 15 and the sections of the member 16, each consists of a pair of oppositely disposed spaced parallel L-shaped bars 25, 26 having their vertical legs 27 (Figure 4) arranged in opposed spaced relation and their horizontal legs 28 oppositely extended and disposed at the lower end of the legs 27. The bottom members are of angle-shaped cross section, have vertical legs (Figure 3) and horizontal legs extended from the upper ends of the vertical legs. The vertical legs of the bottom members are arranged in parallel spaced relation. The bottom members 19, 20, 21 and 22 are of greater length than the bottom members 17, 18, 23 and 24 and extend forwardly from the frame front member 14. The horizontal legs of the bottom members are secured to the horizontal legs of the frame members 14, 15 and 16 by removable holdfast means 29 (Figure 3). The vertical legs of the bottom members 17 and 24 are flush with the ends of the frame members 14, 15 and are arranged inwardly of the outer ends of the outer sections of the frame member 16. The bottom members 18, 23 are flush with the inner ends of the outer sections of the frame member 16. The bottom members 19, 22 are flush with the ends of the inner or intermediate section of the frame member 16.

The drawbar structure 13 includes a pair of forwardly extending oppositely disposed outer bars 30, 31 inclining inwardly throughout and a pair of forwardly extending oppositely disposed inner bars 32, 33 inclining inwardly throughout and arranged between the bars 30, 31. The bars 30, 31, 32, 33 are arranged below and extended forwardly from frame 12. The ends of the bars 30, 31 are connected to the bottom members 17, 24 respectively. The rear ends of the bars 32, 33 are connected to the forward bar 25 of the frame member 15 at spaced points of the latter. The forward ends of the bars 30, 31 abut (Figure 2). The forward terminal portions 33ᵃ of the bars 32, 33 are bent to have their vertical legs abut. The forward ends of the bars 32, 33 abut respectively the inner sides of the bars 30, 31. The bars 30, 31, 32, 33 are of angle-shape to form each with a vertical and a horizontal leg extended from the upper end of the vertical leg. The bars 30, 31 are oppositely disposed and their horizontal legs extend inwardly. The bars 32, 33 are oppositely disposed and their horizontal legs extend inwardly. Mounted on the forward terminal portions of the horizontal legs of the bars 30, 31, 32, 33 is a flat tapered coupling plate 34 which is secured to each of said bars by the holdfast means 35. Secured to the vertical legs of the bars 30, 31 and extended forwardly therefrom is a hitch 36. The hitch is formed of a single length of material to form a loop 37 and a V 38; the latter has its inner faces of its legs secured against the outer faces of the vertical legs of the bars 30, 31 by the holdfast means 39. The loop 37 is positioned against the apex of the triangle formed by the bars 30, 31. The bars 30, 31, 32, 33 are arranged under the frame members 14, 16 and extend towards the bottom members 19, 20, 21 and 22. The bars 32, 33 have their rear ends arranged under the frame member 15. The bottom member 19 has secured to its forward part a forwardly directed combined bracing and coupling arm 40 having an inturned forward portion 41 seating on the horizontal leg of the bar 30 and which is detachably clamped to the latter by a means to be referred to. The bottom member 20 has secured to its forward part a forwardly directed combined bracing and coupling arm 42 having an inturned forward portion 43 seating on the horizontal leg of bar 32 and which is detachably clamped to the latter by a means to be referred to. The bottom member 21 has secured to its forward part a forwardly directed combined bracing and coupling arm 44 having an inturned forward portion 45 seating on the horizontal leg of bar 33 and which is detachably clamped to the latter by a means to be referred to. The bottom member 22 has secured to its forward part a forwardly directed combined bracing and coupling arm 46 having an inturned forward portion 47 seating on the horizontal leg of bar 31 and detachably clamped to the latter by a means to be referred to. The clamping means correlated with the bars 30, 31, 32, 33 are indicated at 48, 49, 50, 51 respectively (Figure 5). The said clamping means are of like form and the construction thereof is as shown in Figure 10 with respect to the bar 30 and it consists of a vertical yoke 52, an apertured clamping plate 53 and a pair of securing nuts 54. The bight of the yoke is arranged against the bottom of the bar, the plate 53 is mounted on the top of the bar and extends laterally in opposite directions from the bar, the sides of the yoke extend upwardly through the plate and the nuts threadedly engage with the upper end of said sides and when screwed home bind against the upper face of the plate whereby a combined bracing and coupling arm is clamped to a bar of the drawbar structure. The said arms couple the drawbar structure in fixed relation with the frame 12 and also act to brace the drawbar structure relative to frame 12.

The machine includes a forward gang, a pair of intermediate gangs and a rear gang of ground working elements. The pair of intermediate elements are laterally disposed with respect to the ends of the forward and the ends of the rear gang. The elements of the forward gang, indicated generally at 55 are arranged in spaced parallel relation, secured to the upper front frame member 14 and extend rearwardly from the latter. The ground working elements of the intermediate pair of gangs, indicated generally at 56 are secured to the ends of the upper intermediate frame member 16 and extend rearwardly therefrom. The elements of the rear gang, indicated generally at 57 are arranged in parallel spaced relation, secured to the upper rear frame member 15 and extend rearwardly therefrom. The elements 55 are disposed in staggered relation with respect to the elements 57. The elements 55, 56 and 57 are of like form and the description of one will apply to the other. Each of the said ground working elements consists of a pair of superposed resilient beams 58, 59 (Figure 4) formed from a length of spring steel of strap like form. The beam 58 is of less length than the beam 59 and is arranged on the latter. The beams 58, 59 are formed of horizontally disposed front portions 60, 61 respectively, and curved rear portions 62, 63 respectively depending from the rear ends of the portions 60, 61 respectively. The rear portion 63 is of greater length than the portion 62, depends from the latter and has its lower or depending part 64 directed forwardly. Positioned against the forward face of and extended from the lower end of part 64 is a plow or shovel 65. The latter is secured to part 64 by the holdfast devices 66. The forward ends of the portions 60, 61 of the beam 58, 59 are adjustably secured together by the holdfast means 67 (Figure 4) which extends through a slot in beam 58. The slot aligns with an opening in the beam 59. The holdfast means 67 bears on the upper face of beam 58 and against the lower face of beam 59.

Each ground working element is detachably secured to and is bodily adjusted relative to its correlated frame member, and for such purpose a clamping structure is employed which includes a clamping plate 68 (Figure 7) formed of a pair of end parts 69 and an intermediate part 70. Each of the parts 69 have upstanding flanges 71. The part 70 is substantially flat, of greater width than the parts 69 and is formed with a pair of spaced aligned openings 72. The clamping structure also includes an upstanding yoke 73 (Figures 4, 6 and 7) having its arms threaded, a pair of clamping nuts 74 (Figures 4 and 6), a bolt 75 and a nut 76 (Figures 4 and 6). The manner in which a ground working element is clamped relative to an upper frame member will be set forth with respect to the rear frame member 15. The upper face of the horizontal portion 60 of the beam 58 is arranged against the lower faces of the horizontal legs 28 of the angle bars 25, 26 of member 15 and bridges the space between the legs 27 of such bars. The beam 58 when so located is to extend at that time the desired distance rearwardly from member 15 and it also is to extend forwardly from such members. The intermediate part 70 of the plate 68 is then arranged against the lower face of the horizontal portion 61 of the beam 59, and with the flanges 71 of the end parts 69 arranged against the side edges of the horizontal portions of the beams 58, 59 and against the horizontal legs 28 of the bars 25, 26. When plate 68 is arranged in the manner as aforesaid the openings 72 in said plate align with the space between the vertical legs 27 of the bars 25, 26. The arms of the yoke 73 are then extended upwardly through the openings 72 and the space between said legs 27 and with the bight of the yoke arranged against the lower face of the part 70 of plate 68. The arms of the yoke are of a length to extend above the upper edges of the legs 27. After the yoke has been positioned in the manner aforesaid, the clamping nuts 74 are engaged with the yoke arms and screwed home against the top edges of the legs 27 for the purpose of clamping the plate 68 against the horizontal legs 28, whereby the ground working element will be clamped in position. After the nuts 74 have been screwed home, the bolt 75 is extended through aligned openings 77 in the legs 27, nut 76 is engaged with bolt 75 and screwed home against the outer face of one leg 27 and which coacts with the head of bolt 75, engaging the outer face of the other leg 27 for clamping the legs 27 and yoke together. When the nuts 74 and 76 are loosened the ground working elements may be adjusted in unison relative to the upper frame members for the purpose of disposing them at the desired extent rearwardly of the said frame members.

The machine includes a pair of supporting devices of like form and generally indicated at 78. These devices preferably will be pneumatically tired wheels 79, 80 and which act as a support for the frame 12. Each wheel is disposed between the transverse median and a side of the frame. The wheels are also independently vertically adjustable for the purpose of raising and lowering a side of the frame 12 to provide for the adjusting of the ground working elements for the purpose of regulating the depth of the latter as is desired. The raising and lowering movements of the frame 12 is had on opposite sides of each wheel whereby such movement will be a balanced one. The wheel 79 is arranged between the bottom frame members 18, 19. The wheel 80 is arranged between the bottom members 22, 23. The said wheels are also arranged between the sections of the upper frame member 16. The wheels 79, 80 are revolubly mounted on oppositely disposed spindles 81, 82 carried by a pair of oppositely disposed angle-shaped pivotally mounted adjustable axles 83, 84 of like form. Each axle includes a leg 85 disposed lengthwise and a leg 86 disposed transversely of frame 12. The leg 86 extends rearwardly from an end of the leg 85. The leg 86 of axle 83 is arranged between the bottom frame members 18, 19 in close proximity to member 19. The leg 86 of axle 84 is arranged between the bottom frame members 22, 23 and in proximity to the member 22. The legs 85 of the axles 83, 84 are disposed rearwardly of and in proximity to the horizontal leg 28 of the angle bar 26 of the upper front frame member 14, and the said leg 28 has secured thereto and extending rearwardly therefrom two spaced pairs of spaced combined coupling, suspension and bearing elements. The elements of one pair are indicated at 87 and the elements of the other pair at 88. The elements 87 constitute bearings for the leg 85 of axle 83. The elements 88 constitute bearings for the leg of axle 84. The elements 87, 88 also constitute means for supporting, suspending and coupling the legs 85 of the axles to the upper front frame member 14. The spindles 81, 82 are disposed at right angles to and are integral or secured to the legs 86 of the axles forwardly of the rear ends of such legs. Each leg 86 has a reduced rear end 89.

Each axle is adjustable in a direction for the purpose of elevating and lowering the wheel which is correlated therewith to raise and lower one side of the frame 12, and there is associated with each axle an adjusting structure therefor. The said adjusting structures generally indicated at 90, 91 are of like form, oppositely disposed and secured upon the frame 12. Each adjusting structure includes an upstanding lever 92. The lever 92 of structure 90 is pivotally connected at its lower end, as at 93 to and on the outer side of the bottom frame member 19. The lever 92 of the structure 91 is pivotally connected at its lower end, as at 94 to and on the outer side of the bottom frame member 22. There is positioned in proximity to the inner side of lever 92, as well as extending forwardly and rearwardly with respect to the lever an angle bar 95 of substantially arcuate contour. The bar 95 is formed of a leg 96 and a leg 97. The leg 96 is disposed at right angles to the outer end of leg 97. The leg 96 is formed substantially throughout with a row of spaced openings 98. The bar 95 is disposed transversely with respect to frame 12 and curves downwardly and forwardly from its rear to its forward end. The rear or upper end of bar 95 is formed with a depending flange 99, which is integral with the legs 96, 97 and extends inwardly from leg 97. Secured at its lower end, as at 100 to the leg 28 of the bar 26 of the rear upper frame member 15 is a supporting standard 101 for the bar 95. The standard 101 at its upper end abuts the rear or upper ends of the legs of bar 95. Secured at their lower ends, as at 102 (Figure 3) to the leg 27 of the bar 26 of the upper rear frame member 15 are a pair of upstanding oppositely inclined torsionally twisted brace members 103 for the standards 101. The upper end portions of members 103 are bent to abut the standards 101. The leg 97 of a bar 95, upper portion of a standard 101 and upper portion of a member 103 are secured together by the holdfast means 104 (Figure 3).

Each lever 92 (Figure 9) below the bar 95 has secured to the inner side thereof, as at 104ᵃ an arm 105 having an offset upper portion formed with an opening 106ᵃ. There is correlated with the levers 92 adjusting members or link elements 107 for the axles 83, 84. Each adjusting member 107 (Figure 8) is formed of two bars 108, 109, which are fixedly secured in abutting relation intermediate their ends by the holdfast means 110. One of the end terminal portions of the bar 108 is offset, as at 111 with respect to the corresponding end terminal portion of the bar 109 to form a clearance 112. The other end terminal portion of the bar 109 is offset, as at 113 with respect to the corresponding end terminal portion of the bar 108 to form a clearance 114. The reduced rear portions 89 of the legs 86 of the axles 83, 84 extend into the clearances 112 and are pivotally connected to the adjusting members 107, as at 115. The levers 92 pass upwardly through the clearances 114 and are pivotally connected with the members 107 by the headed pivots 116 extending through the members 107, the levers 92 and the offset upper portions of the arms 105. The pivots 116 are connected in any suitable manner to the levers 92, arms 105 and members 107. By the arrangement stated with respect to the axles, members 107 and levers 92, when a lever is shifted it will carry its correlated member 107 therewith and such member will provide for the adjusting of an axle.

The machine includes spring controlled lever and link operated latching mechanisms 117 carried by the levers 92 for correlation with the bars 95 to releasably latch the levers 92 in their shifted position whereby the wheels 79, 80 will be held in their adjusted positions. The bars 95 are termed keepers. The mechanisms 117 include spring controlled latching members 118 normally tending to engage in the openings of or against the outer faces of the legs 96 of the bars 95. When a latching member 118 is engaged in an opening in a bar 95, a wheel 79 or 80 is held in the adjusted position until the member 118 is moved out of such opening. The lever and link of a mechanism 117 function to withdraw the member 118 out of the opening in the bar 95 against the action of the controlling spring for such member. The mechanisms 117 are of known form.

The manner of setting up the ground working elements will permit flexibility and vibration in plowing. Each of such elements is of a form which will permit of the activity thereof at any desired depth up to eight inches. The flexibility of said elements causes the ground, when the elements are active to be broken with cloddy or irregular cutting which has a tendency to make the ground surface rough instead of pulverized.

The upper beam of each ground working element is capable of being shifted relative to the lower beam forwardly or rearwardly with respect to the lower beam to provide for the desired vibration and strength of the element according to the kind of soil being plowed or also to provide for the element being substantially rigid. The means for securing the beams together at their forward ends is detachable or capable of being loosened and the upper beam formed with a slot to permit it to shift relative to such means and the lower beam.

Owing to the manner in which the ground working elements are connected to the frame members 14 and 15, the said elements may be arranged relative to said members at any desired point on the latter. This statement applies to the ground working elements, which are attached to frame member 16. The number of elements of the forward or rear gang may be as desired and this also applies to the intermediate ground working devices.

The ground working elements of the forward gang or set may be spaced at any desired point with respect to the frame member 14 to permit of an extra gang or set of ground working elements, working alternately with respect to the elements of the forward gang or set; by having this extra set in any desired number on the frame member 16 or intermediate part of the frame, it will leave the rear gang or set in some fixed position, as indicated in Figure 1.

With reference to Figure 1, it discloses the rear of seven working elements offset as to the front gang or set and as to the intermediate gang or set. Now assuming that the intermediate part of the frame, that is frame member 16, has attached thereto a greater number or extra set of ground working elements, the forward gang would be so changed to any desired position or number to permit the gang of ground working elements on the intermediate part of the frame to be arranged alternately with respect to the forward ground working elements, whereby the furrows would be created between the ridges made by the forward elements, and in this way the central part of the frame could be utilized for an extra number of ground working elements, for weedy ground, or for any other desired purpose, and still not interfere with the work performed by the gang of assembled ground working elements on the forward and rear parts of the frame.

The position of the members 107 and their arrangement relative to the levers 92 will equalize the weight in lifting or lowering ground working elements when the levers 92 are operated independently or in unison. The lever adjustment operating in connection with the axles 83, 84, holding the wheels and being fastened to the frame lifts the entire frame at such an angle and in such a position as to perfectly raise or lower the ground working elements as well as equalize the weight to make the lifting easy on account of the balanced and equal distribution of the weight of the frame. The levers work forward to lift the frame, and when released the weight of the frame causes it to drop and the ground working elements to be positioned in the ground. The levers 92 may be latched at the desired point on the bar 95 for selectively positioning the ground working elements at their desired depth.

Each of the clamping devices 48, 49, 50 and 51 may include an angle-shaped reinforcing member, and such member is shown and indicated at 55ª Figure 10.

The clamping means 87, 88 are of like form and with reference to Figure 11, each consists of an inverted U-shaped clamping member 87b formed at its lower end with a pair of oppositely disposed flanges 87c, one seating on the leg 28 of the bar 26 and the other seating on a shim 87d which aligns with a portion of the rear edge of the leg 28, of the bar 26. The shim 87d is flush with a portion of and extends rearwardly from leg 28. The shims 87d are mounted on the upper surfaces of the bottom members 19, 20, 21, 22 of the frame. The front flanges 87c of each member 87b, a bottom frame member and the leg 28 of the bar 26 are secured together by a holdfast means 88. The rear flange 87c of each member 87b, a shim 87d and one of the bottom members aforesaid are secured together by a holdfast means 88. A leg 85 of an axle is mounted on a pair of shims 87d and extends through a pair of clamping members 87b. The clamping members 87b which are secured to the bottom frame members 20, 21 are provided at their top with adjustable stop screws 87a. Each screw is engageable in annular grooves, not shown, formed in the periphery of and at a point in close proximity to the end of a leg 85 of an axle. The stop screws 87a arrest the shifting of the axles lengthwise of the machine frame, but do not interfere with the adjustment of the axle.

The bars 32, 33 are referred to as having their horizontal legs extending inwardly, but it is to be understood that such legs may extend outwardly. The connections between the rear ends of the bars 32, 33 and the frame member 15 may be as desired, but preferably such connections will correspond to the clamp-means employed for binding or clamping the beams to the frame.

The machine includes what may be termed a pair of spaced parallel oppositely disposed combined supporting, adjusting and latching structures for and carried by the frame. Each of such structures extends into one of the horizontally disposed clearances and consists of one of the supporting devices 78, one of the adjusting structures (90 or 91) and one of the latching mechanisms 117 and are correlated relative to each other and with respect to the frame, in a manner as hereinbefore fully set forth.

What we claim is:

1. In an agricultural machine, upper front, intermediate and rear frame members disposed in parallel spaced relation, said intermediate member being formed of a central and a pair of end sections, said sections being disposed in endwise alignment and with the central section spaced from said end sections to provide a pair of clearances, a series of spaced parallel lower frame members secured to the bottoms of the upper frame members, two pairs of the inner ones of the frame members of the said series of lower frame members being located at opposed ends of said sections and bordering said clearances, a pair of spaced parallel oppositely disposed L-shaped axles each having a rear leg arranged in a clearance and a forwrd leg disposed rearwardly of and parallel to the upper front frame member, means at the rear of the upper frame member and connected with the latter for pivotally supporting said forward legs, supporting wheels arranged in said clearances and revolubly carried by said rear legs, a pair of axle adjusting and latching means each mounted on said central section and the upper rear frame member and having a part pivotally connected to one of the lower frame members of the said pairs of inner lower frame members, each of said means having a shiftable part extended into a clearance and pivotally connected to the rear leg of an axle for adjusting the latter, spaced resiliently supported ground working elements secured with and arranged rearwardly of each of the upper frame members, and a drawbar structure of skeleton form secured to the upper rear frame member and to the outer ones of the series of lower frame members, said structure being extended forwardly of and arranged below said upper frame member.

2. In an agricultural machine, upper front, intermediate and rear frame members disposed in parallel spaced relation, said intermediate member being formed of a central and a pair of end sections, said sections being disposed in endwise alignment and with the central section spaced from said end sections to provide a pair of clearances, a series of spaced parallel lower frame members secured to the bottoms of the upper frame members, two pairs of the inner ones of the frame members of the said series of lower frame members being located at opposed ends of said sections and bordering said clearances, a pair of spaced parallel oppositely disposed L-shaped axles each having a rear leg arranged in a clearance and a forward leg disposed rearwardly of and parallel to the upper front frame member, means at the rear of the upper frame member and connected with the latter for pivotally supporting said forward legs, supporting wheels arranged in said clearances and revolubly carried by said rear legs, a pair of axle adjusting and latching means each mounted on said central section and the upper rear frame member and having a part pivotally connected to one of the lower frame members of the said pairs of inner lower frame members, each of said means having a shiftable part extended into a clearance and pivotally connected to the rear leg of an axle for adjusting the latter, spaced resiliently supported ground working elements secured with and arranged rearwardly of each of the upper frame members, a drawbar structure of skeleton form secured to the upper rear frame member and to the outer ones of the series of lower frame members, said structure being extended forwardly of and arranged below said upper frame member, and spaced combined bracing and coupling means for said structure carried by a plurality of inner lower frame members of said series, extended forwardly of said upper frame member and connected to said structure at spaced points of the latter.

3. In an agricultural machine, upper front, intermediate and rear frame members disposed in parallel spaced relation, said intermediate member being formed of a central and a pair of end sections, said sections being disposed in endwise alignment and with the central section spaced from said end sections to provide a pair of clearances, a series of spaced parallel lower frame members secured to the bottoms of the upper frame members, two pairs of the inner ones of the frame members of the said series of lower frame members being located at opposed ends of said sections and bordering said clearances, a pair of spaced parallel oppositely disposed L-shaped axles each having a rear leg arranged in a clearance and a forward leg disposed rearwardly of and parallel to the upper front frame member, means at the rear of the upper frame member and connected with the latter for pivotally supporting said forward legs, supporting wheels arranged in said clearances and revolubly carried by said rear legs, a pair of axle adjusting and latching means each mounted on said central section and the upper rear frame member and having a part pivotally connected to one of the lower frame members of the said pairs of inner lower frame members, each of said means having a shiftable part extended into a clearance and pivotally connected to the rear leg of an axle for adjusting the latter, spaced sets of spaced upper resilient horizontally disposed beams, the beams of each set having their forward ends positioned against the lower surface of an upper frame member and formed of elongated straight portions terminating in depending forwardly directed rear end portions, horizontally disposed resilient lower beams having elongated straight portions terminating in depending forwardly directed rear end portions, said lower beams being of greater length than, bearing against and having their depending portions extending forwardly of the rear ends of said upper beams, means for securing the forward ends of the upper and lower beams to the upper frame members, and a ground working element secured to the forwardly projecting rear end portion of each of said lower beams.

4. In an agricultural machine, upper front, intermediate and rear frame members disposed in parallel spaced relation, said intermediate member being formed of a central and a pair of end sections, said sections being disposed in endwise alignment and with the central section spaced from said end sections to provide a pair of clearances, a series of spaced parallel lower frame members secured to the bottoms of the upper frame members, two pairs of the inner ones of the frame members of the said series of lower frame members being located at opposed ends of said sections and bordering said clearances, a pair of spaced parallel oppositely disposed L-shaped axles each having a rear leg arranged in a clearance and a forward leg disposed rearwardly of and parallel to the upper front frame member, means at the rear of the upper frame member and connected with the latter for pivotally supporting said forward legs, supporting wheels arranged in said clearances and revolubly carried by said rear legs, a pair of axle adjusting and latching means each mounted on said central section and the upper rear frame member and having a part pivotally connected to one of the lower frame members of the said pairs of inner lower frame members, each of said means having a shiftable part extended into a clearance and pivotally connected to the rear leg of an axle for adjusting the latter, spaced sets of spaced upper resilient horizontally disposed beams, the beams of each set having their forward ends positioned against the lower surface of an upper frame member and formed of elongated straight portions terminating in depending forwardly directed rear end portions, horizontally disposed resilient lower beams having elongated straight portions terminating in depending forwardly directed rear end portions, said lower beams being of greater length than, bearing against and having their depending portions extending forwardly of the rear ends of said upper beams, means for securing the forward ends of the upper and lower beams to the upper frame members, a ground working element securing to the forwardly projecting rear end portion of each of said lower beams, a drawbar structure of skeleton form secured to the upper rear frame member and the outer ones of the series of the lower frame members, said structure being extended forwardly of and arranged below said upper front frame member, and spaced combined bracing and coupling means for said structure carried by a plurality of inner ones of the series of lower frame members, extended forwardly of said upper front frame member and connected to said structure at spaced points of the latter.

5. In an agricultural machine, a frame including upper front, intermediate and rear transverse members disposed in parallel spaced relation and a series of spaced parallel horizontal lower members secured to the bottoms of said transverse members, said upper and lower members being so related to provide a pair of horizontally disposed rectangular clearances each positioned between the horizontal median and a side of the frame, a pair of oppositely disposed spaced parallel combined supporting, adjusting and latching structures for said frame extending into said clearances, supported from said intermediate and rear upper members and each having a part pivotally connected to one of the lower members of said series, means for pivotally connecting said structures at their fronts to the frame rearwardly of and in proximity to said upper front member, a set of spaced ground working elements rearwardly of each upper member, spaced resilient carriers for each set of elements secured to and extended rearwardly of an upper member, a skeleton drawbar structure arranged below said members connected to the outer lower members of said series and to spaced points of the rear upper member, said drawbar structure extending forwardly of said upper front member, and spaced combined bracing and coupling means carried by a plurality of inner ones of the lower frame members of said series, extending forwardly of said front upper member and connected to spaced points of said drawbar structure.

6. In an agricultural machine, upper front, intermediate and rear frame members disposed in parallel spaced relation, said intermediate member being formed of a central and a pair of end sections, said sections being disposed in endwise alignment and with the central section spaced from said end sections to provide a pair of clearances, a series of spaced parallel lower frame members secured to the bottoms of the upper frame members, two pairs of the inner ones of the frame members of the said series of lower frame members being located at opposed ends of said sections and bordering said clearances, a pair of spaced parallel oppositely disposed L-shaped axles each having a rear leg arranged in a clearance and a forward leg disposed rearwardly of and parallel to the upper front frame member, means at the rear of the upper frame member and connected with the latter for pivotally supporting said forward legs, supporting wheels arranged in said clearances and revolubly carried by said rear legs, a pair of axle adjusting and latching means each mounted on said central section and the upper rear frame member and having a part pivotally connected to one of the lower frame members of the said pairs of inner lower frame members, each of said means having a shiftable part extended into a clearance and pivotally connected to the rear leg of an axle for adjusting the latter, spaced sets of spaced upper resilient horizontally disposed beams, the beams of each set having their forward ends positioned against the lower surface of an upper frame member and formed of elongated straight portions terminating in depending forwardly directed rear end portions, horizontally disposed resilient lower beams having elongated straight portions terminating in depending forwardly directed rear end portions, said lower beams being of greater length than, bearing against and having their depending portions extending forwardly of the rear ends of said upper beams, means for securing the forward ends of the upper and lower beams to the upper frame members, a ground working element secured to the forwardly projecting rear end portion of each of said lower beams, each upper beam and its assoicated lower beam being adjustable one relatively to the other, and each upper beam and its associate lower beam having coacting means for securing them in adjusted relation, said coacting means being disposed forwardly of each of said upper members.

JAKOB PFEIFER.
WALTER G. HUEBNER.